(12) United States Patent  
Camenisch et al.

(10) Patent No.: US 8,688,591 B2  
(45) Date of Patent: Apr. 1, 2014

(54) ANONYMOUS SEPARATION OF DUTIES WITH CREDENTIALS

(75) Inventors: Jan L. Camenisch, Thalwil (CH); Christopher J. Giblin, Zurich (CH); Thomas R. Gross, Zurich (CH); Guenter Karjoth, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 12/536,874

(22) Filed: Aug. 6, 2009

(65) Prior Publication Data

US 2011/0035241 A1  Feb. 10, 2011

(51) Int. Cl.  
*G06Q 20/00* (2012.01)

(52) U.S. Cl.  
USPC ............................................. 705/74; 705/64

(58) Field of Classification Search  
USPC ...................................................... 705/50–79  
See application file for complete search history.

(56) References Cited

U.S. PATENT DOCUMENTS

| | | | | |
|---|---|---|---|---|
| 6,014,646 A * | 1/2000 | Vallee et al. | ..................... | 705/39 |
| 2006/0155985 A1* | 7/2006 | Canard et al. | .................. | 713/156 |
| 2009/0205016 A1* | 8/2009 | Milas | ................. | 726/1 |
| 2010/0162406 A1* | 6/2010 | Benameur et al. | .............. | 726/26 |

OTHER PUBLICATIONS

White, Ron, "How Computers Work", Millennium Ed., Que Corporation, Indianapolis, IN, 1999.*  
Camenisch et al., Compact E-Cash, [online]; [retreived online on Aug. 31, 2009]; retrieved from the Internet http://www.cs.brown.edu/~anna/papers/ch105-full.pdf.  
Camenisch et al., An Efficient System for Non-transferable Anonymous Credentials with Optional Anonymity Revocation, [online]; [retrieved on Aug. 31, 2009]; retrieved from the Internet http://groups.csail.mit.edu/cis/pubs/lysyanskaya/cl01a.pdf.

* cited by examiner

*Primary Examiner* — Chrystina Zelaskiewicz  
(74) *Attorney, Agent, or Firm* — Cantor Colburn LLP; Daniel Morris

(57) ABSTRACT

A system for anonymous separation of duties with credentials includes an identity provider, the identity provider configured to issue anonymous credentials to a user based on one or more attributes of the user; a service provider, the service provider configured to issue a pseudonym to the user based on the user's anonymous credentials, and to associate the user's pseudonym with a step of an instance of a business process hosted on the service provider, the step being completed by the user; and an auditor, the auditor configured to determine if the completion of the step of the instance of the business process by the user is compliant with a separation of duties policy.

16 Claims, 3 Drawing Sheets

ANONYMOUS SEPARATION OF DUTIES WITH CREDENTIALS

BACKGROUND

This disclosure relates generally to the field of transaction auditing.

Transactions performed within an organization, including but not limited to financial transactions such as purchasing or expense reimbursement, or military applications, may be vulnerable to fraud. Separation of Duties (SoD) is a technique which may reduce the risk of fraud in such transactions by requiring certain steps in the transaction process to be performed by different individuals or roles. A SoD policy may break sensitive transactions into a series of steps, and assign access rights to the steps in a manner such that a single person or party is not permitted to perform all of the steps. For example, in an expense reimbursement process, the steps of expense submission, approval and payment may each be performed by different individuals, lessening the likelihood of fraud by disallowing a single person making a reimbursement payment.

Compliance with SoD policies may be a key focus of a financial audit of an organization. Auditing may be automated; a system such as Continuous Auditing (CA) may grant an auditor direct and continuous access to transactional information. However, unfiltered access to transactional information for auditing purposes may present a violation of both customer and employee privacy.

SUMMARY

An exemplary embodiment of a system for anonymous separation of duties with credentials includes an identity provider, the identity provider configured to issue anonymous credentials to a user based on one or more attributes of the user; a service provider, the service provider configured to issue a pseudonym to the user based on the user's anonymous credentials, and to associate the user's pseudonym with a step of an instance of a business process hosted on the service provider, the step being completed by the user; and an auditor, the auditor configured to determine if the completion of the step of the instance of the business process by the user is compliant with a separation of duties policy.

An exemplary embodiment of a method for anonymous separation of duties with credentials includes verifying by a service provider anonymous credentials issued to a user by an identity provider based on one or more attributes of the user; issuing a pseudonym to the user based on the verified anonymous credentials; and associating the user's pseudonym with a step of an instance of a business process hosted on the service provider, the step of the business process being completed by the user; wherein whether the completed step of the instance of the business process is compliant with a separation of duties policy is determinable by an auditor.

An exemplary embodiment of a computer program product includes a computer readable storage medium containing computer code that, when executed by a computer, implements a method for anonymous separation of duties with credentials, the method comprising verifying by a service provider anonymous credentials issued to a user by an identity provider based on one or more attributes of the user; issuing a pseudonym to the user based on the verified anonymous credentials; and associating the user's pseudonym with a step of an instance of a business process hosted on the service provider, the step of the business process being completed by the user; wherein whether the completed step of the instance of the business process is compliant with a separation of duties policy is determinable by an auditor.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for anonymous separation of duties (SoD) with credentials are provided, with exemplary embodiments being discussed below in detail. An auditor may be granted access to sufficient information to ascertain that SoD policies are being followed without receiving data that may compromise privacy standards of the organization being audited. In some embodiments, an auditor may be able to identify a violation of a SoD policy without knowing the specific identity of any individual involved in the transaction. Only the organization being audited may be able to recover specific individual's identity.

An anonymous credential system may issue anonymous credentials to a user based on user attributes. A user may establish a pseudonym using the issued credentials when logging into a business process. The user may prove that he/she possesses required attributes to perform a process step using the issued credentials, and store the pseudonym. The pseudonym remains constant during the user's session with the business process, and is not linkable to the real identity of the user. The pseudonym may be either an arbitrary value set or a domain pseudonym tied to information provided by a service provider, and may be used to enforce that a user may take part in an instance of a business process only once.

Figure 1:
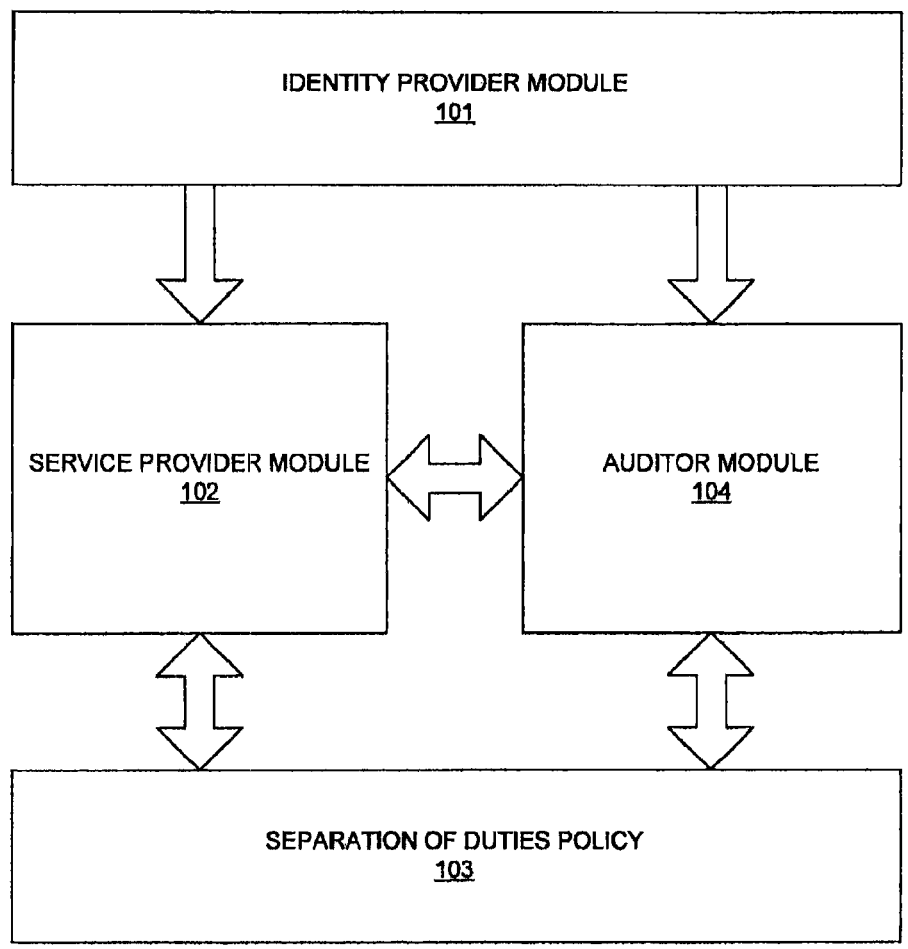
FIG. 1 illustrates an embodiment of a system for anonymous separation of duties with credentials.

FIG. 1 illustrates an embodiment of a system 100 for anonymous separation of duties with credentials. Identity provider 101 certifies that a user possesses any number of attributes, and issues anonymous credentials to the user reflecting the certified attributes. Examples of user attributes that may be certified by identity provider 101 may include but are not limited to membership in a company, organization, research or business unit, a role of the user in a hierarchy, such as status as a manger or clerk, any particular expertise of the user, or any personal data, for example, that the user is older than 18. In some embodiments, the anonymous credentials may comprise a security token with an electronic signature reflecting the user's verified attributes. Identity provider 101 stores certification keys corresponding to a user's anonymous credentials. A public key corresponding to a user's certification key may be made available to requestors. A user may receive anonymous credentials from multiple identity providers; a single identity provider is shown in the embodiment of FIG. 1 for illustrative purposes only.

A user may log on to service provider 102 using the anonymous credentials received from identity provider 101 in order to perform all or part of an instance of a business process hosted on service provider 102. Service provider 102 obtains a public key of the identity provider 101 associated with the user, and validates the user's credentials using the public key. The service provider issues a pseudonym for the validated user; the pseudonym may comprise an arbitrary value set, or a domain pseudonym in some embodiments. The domain pseudonym may be based on information provided by the service provider, including but not limited to a session, transaction, document, identifier, or random value. Service provider 102 may host any number and type of business process instances, which are governed by SoD policy 103. A business process may comprise multiple steps, or actions, that may be executed by one or more users, as specified by SoD policy 103. For example, in some embodiments, the user may be required by SoD policy 103 to have certain attributes to execute specific steps of an instance of a business process on service provider 102. In some embodiments the SoD policy 103 may require that different users execute various steps of a particular instance of a business process. For example, in an embodiment comprising a second-set-of-eyes principle, SoD policy 103 may state that a financial transaction comprising a submission step and a confirmation step must be submitted by a user with clerk role, and must be confirmed by a user with manager role, with an additional condition that the submission and confirmation must to be performed by different users.

Auditor 104 may obtain a user's public key from identity provider 101. Auditor 104 may then use the public key to verify that any steps of an instance of a business process hosted on service provider 102 required to be performed by different users are indeed performed by different users, as required by the SoD policy 103, without knowledge of the specific identity of any particular user.

Figure 2:
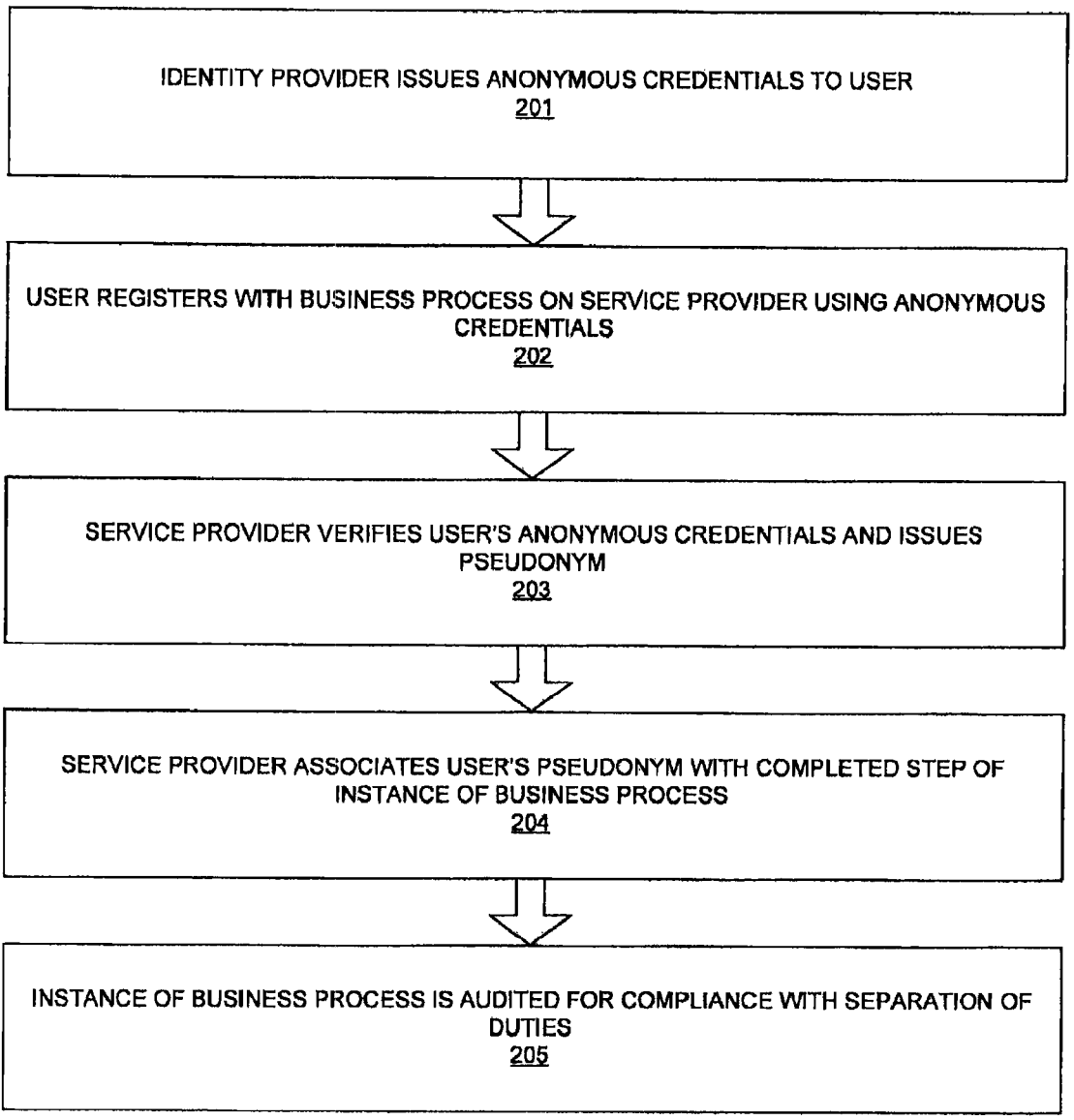
FIG. 2 illustrates an embodiment of a method for anonymous separation of duties with credentials.

FIG. 2 illustrates an embodiment of a method 200 for anonymous separation of duties with credentials. FIG. 2 is discussed with reference to FIG. 1. In block 201, identity provider 101 issues anonymous credentials to a user reflecting any set or subset of the user's attributes. In some embodiments, the anonymous credentials may comprise a security token with an electronic signature reflecting the user's verified attributes. Examples of user attributes that may be certified by identity provider 101 may include but are not limited to membership in a company, organization, research or business unit, a role of the user in a hierarchy, such as status as a manger or clerk, any particular expertise of the user, or any personal data, for example, that the user is older than 18. In block 202, the user registers with an instance of a business process hosted on service provider 102 using the credentials received from identity provider 101. In block 203, service provider 102 obtains a public key corresponding to the user's credentials from identity provider 101, uses the public key to verify the user's credentials, and issues a pseudonym for the verified user. A user may only have one pseudonym per instance of a business process he/she participates in. The pseudonym may comprise an arbitrary value set in some embodiments, or a domain pseudonym in other embodiments. The domain pseudonym may be based on information provided by the service provider, including but not limited to a session, transaction, document, identifier, or random value. In block 204, the user performs a step of an instance of a business process hosted on service provider 102, and the user's pseudonym is associated with the completed process step. In some embodiments, the service provider 102 stores the process step and the user's pseudonym in a SoD log, which may include but is not limited to a log file, a log database, or a logging server. In block 205, the business process instance is audited for compliance with SoD policy 103. Auditing may be continuous or static. The auditor 104 may validate user credentials using a public key corresponding to the user's credentials obtained from the identity provider 101, and check whether there is a SoD violation in a business process instance by comparing pseudonyms associated with the completed process steps.

Some embodiments may comprise a revocation list. A revocation list ensures that a user cannot login twice to the same business process instance, or register two different pseudonyms to the same instance. For each instance of a business process, service provider 102 may establish a random session identifier. A user logging in to a business process on service provider 102 may establish a new pseudonym. The pseudonym is established using the user's anonymous credentials, and bound to the user's main identity or master key. In some embodiments, a unique value corresponding to the user is obtained by, for example, combining the user's master key and the random session identifier, hashing the user's master key, or using a secret value of the user from a cryptographic accumulator. This unique value may be added to a revocation list by service provider 102. The service provider 102 may verify that new future users logging into a business process instance have not previously logged on to the instance before by checking the revocation list. The service provider 102 is thereby protected against a malicious user circumventing the SoD policy.

Separation of the identity provider 101 and the service provider 102 allow for location of the identity provider 101 functionality at an independent entity or trusted custodian in some embodiments. The user's privacy is therefore protected even if identity provider 101, service provider 102, and auditor 104 collude. The true identity of a user may be embedded in completed business processes, such that a trusted third party may revoke a user's anonymity in cases of detected fraud.

Some embodiments may incorporate an anonymous credential system such as the Camenisch and Lysyanskaya scheme (see An Efficient System for Non-transferable Anonymous Credentials with Optional Anonymity Revocation, Camenisch and Lysyanskaya, 2001, for further details). In some embodiments, to ensure that an anonymous user cannot access the system multiple times while entering in multiple roles, accountability mechanisms such as the identity mixer credential system scheme (see An Identity Escrow Scheme with Appointed Verifiers, Camenisch and Lysyanskaya, 2001, for further details) in conjunction with compact e-cash primitives (see Compact E-Cash, Camenisch, Hohenberger, Kohlweiss, and Lysyanskaya, 2006, for further details) may be used. In such embodiments, in addition to each user being required to have anonymous credentials issued by identity provider 101, each user may obtain one e-coin per business process, or an e-coin dispenser for multiple business processes. The e-coins may be tied to specific business process identifiers. A user may be prevented from participating in a transaction more than once (or any specified number of times) by forcing the user to spend an e-coin when entering the transaction. A spent e-coin may be stored centrally. If a user attempts to enter a business process a second time, it may be determined that he/she has already spent the required e-coin. If the principal continues with the transaction and spends the e-coin again, the double-spending protection of the e-cash scheme may be used to uncover the user's true identity, using, for example, a uniquely solvable linear equation. Thus, the double-spending property of the e-cash scheme protects against SoD circumvention. Users perpetrating potential fraud may be automatically uniquely identified.

Figure 3:
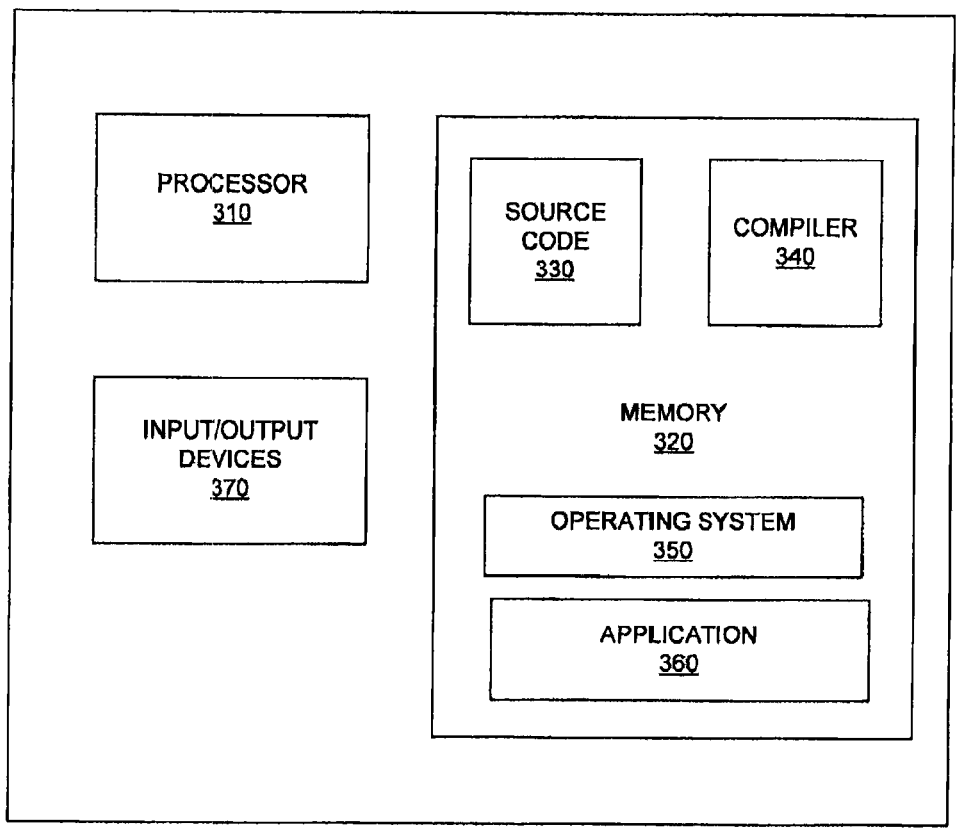
FIG. 3 illustrates an embodiment of a computer that may be used in conjunction with embodiments of systems or methods for anonymous separation of duties with credentials.

FIG. 3 illustrates an example of a computer 300 having capabilities, which may be utilized by exemplary embodiments of a method for anonymous separation of duties with credentials as embodied in software. Various operations discussed above may utilize the capabilities of the computer 300. One or more of the capabilities of the computer 300 may be incorporated in any element, module, application, and/or component discussed herein.

The computer 300 includes, but is not limited to, PCs, workstations, laptops, PDAs, palm devices, servers, storages, and the like. Generally, in terms of hardware architecture, the computer 300 may include one or more processors 310, memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include determination of compliance with separation of duties policies while upholding privacy standards.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for anonymous separation of duties with credentials, the system comprising:
    an identity provider computer, the identity provider computer programmed to issue anonymous credentials and an associated public key to a user based on one or more attributes of the user, the one or more attributes of the user comprising one or more of: membership in a company, organization, research, or business unit by the user, a role of the user in a hierarchy, an expertise of the user, and an age of the user;
    a service provider computer, the service provider computer programmed to obtain the user's public key from the identity provider computer, to verify the user's anonymous credentials using the public key, and to issue a pseudonym to the user based on the user's verified anonymous credentials, and further programmed to associate the user's pseudonym with a step of an instance of a business process hosted on the service provider computer, the step of the instance of the business process being completed by the user; and
    an auditor computer, the auditor computer programmed to obtain the user's public key from the identity provider computer and determine if the completion of the step of the instance of the business process by the user is compliant with a separation of duties policy using the public key, wherein the separation of duties policy states that one or more steps of the business process must be completed by different users;
    wherein the auditor computer is programmed to determine compliance with the separation of duties policy without knowledge of an identity of the user, and the service provider computer is programmed to recover the identity of the user based on a violation of the separation of duties policy.

2. The system of claim 1, wherein the service provider computer is further programmed to associate the pseudonym and the completed step in a log.

3. The system of claim 2, wherein the auditor computer is further programmed to determine compliance with the separation of duties policy by examining the log.

4. The system of claim 1, wherein the service provider computer is programmed to receive an e-coin from the user before allowing the user to complete the step of the instance of the business process.

5. The system of claim 1, wherein the service provider computer is further programmed to add the user to a revocation list for the instance of the business process.

6. The system of claim 1, wherein the anonymous credentials comprise a security token with an electronic signature.

7. The system of claim 1, wherein the pseudonym comprises a domain pseudonym, the domain pseudonym being related to one of a session, a transaction, a document identifier, or a random value provided by the service provider computer.

8. A computer-implemented method implemented by a service provider computer programmed to perform anonymous separation of duties with credentials, the method comprising:
    verifying, by a processor of the service provider computer, anonymous credentials issued to a user by an identity provider based on one or more attributes of the user, the one or more attributes of the user comprising one or more of: membership in a company, organization, research, or business unit by the user, a role of the user in a hierarchy, an expertise of the user, and an age of the user, wherein the service provider verifies the anonymous credentials using a public key associated with the user that is obtained from the identity provider;
    issuing, by the processor of the service provider computer, a pseudonym to the user based on the verified anonymous credentials;
    associating, by the processor of the service provider computer, the user's pseudonym with a step of an instance of a business process hosted on the service provider computer, the step of the instance of the business process being completed by the user;
    wherein whether the completed step of the instance of the business process is compliant with a separation of duties policy is determined by a processor of an auditor computer by obtaining the user's public key from the identity provider, wherein the separation of duties policy states that one or more steps of the business process must be completed by different users, wherein determining compliance with the separation of duties policy by the auditor computer without knowledge of an identity of the user; and recovering, by the processor of the service provider computer, the identity of the user based on a violation of the separation of duties policy.

9. The method of claim 8, further comprising associating the pseudonym and the completed step in a log by the processor of the service provider computer.

10. The method of claim 9, further comprising determining by the processor of the auditor computer whether the completed step is compliant with a separation of duties policy by examining the log by the auditor computer.

11. The method of claim 8, wherein the processor of the service provider computer receives an e-coin from the user before the user completes the step of the instance of the business process.

12. The method of claim 8, further comprising adding the user to a revocation list for the instance of the business process by the processor of the service provider computer.

13. The method of claim 8, wherein the anonymous credentials comprise a security token with an electronic signature.

14. The method of claim 8, wherein the pseudonym comprises a domain pseudonym, the domain pseudonym being related to one of a session, a transaction, a document identifier, or a random value provided by the service provider computer.

15. A computer program product for anonymous separation of duties with credentials, the computer program product comprising a non-transitory computer readable storage medium having computer readable program code embodied therewith, said computer readable program code being executable by a processor to:

verify by a service provider anonymous credentials issued to a user by an identity provider based on one or more attributes of the user, the one or more attributes of the user comprising one or more of: membership in a company, organization, research, or business unit by the user, a role of the user in a hierarchy, an expertise of the user, and an age of the user, wherein the service provider verifies the anonymous credentials using a public key associated with the user that is obtained from the identity provider;

issue a pseudonym to the user based on the verified anonymous credentials; and associate the user's pseudonym with a step of an instance of a business process hosted on the service provider, the step of the instance of the business process being completed by the user;

wherein whether the completed step of the instance of the business process is compliant with a separation of duties policy is determinable by an auditor by obtaining the user's public key from the identity provider, wherein the separation of duties policy states that one or more steps of the business process must be completed by different users, wherein determining compliance with the separation of duties policy by the auditor without knowledge of an identity of the user; and recover the identity of the user based on of a violation of the separation of duties policy.

16. The system of claim 1, wherein the identity provider computer is further programmed to revoke the user's anonymity based on a violation of the separation of duties policy by the user being determined by the auditor computer.

* * * * *